United States Patent
Leininger et al.

(10) Patent No.: US 9,003,195 B1
(45) Date of Patent: Apr. 7, 2015

(54) PASSWORD TOPOLOGY MONITORING AND ENFORCEMENT

(71) Applicants: Henry Lewis Leininger, Vienna, VA (US); Klayton Lee Monroe, Brighton, MI (US); Michael Thomas Wollman, Oceanport, NJ (US)

(72) Inventors: Henry Lewis Leininger, Vienna, VA (US); Klayton Lee Monroe, Brighton, MI (US); Michael Thomas Wollman, Oceanport, NJ (US)

(73) Assignee: KoreLogic, Inc., Deale, MD (US)

( * ) Notice: Subject to any disclaimer, the term of this patent is extended or adjusted under 35 U.S.C. 154(b) by 0 days.

(21) Appl. No.: 14/447,534

(22) Filed: Jul. 30, 2014

Related U.S. Application Data

(60) Provisional application No. 61/859,955, filed on Jul. 30, 2013.

(51) Int. Cl.
*G06F 21/00* (2013.01)
*G06F 21/31* (2013.01)

(52) U.S. Cl.
CPC .................................... *G06F 21/31* (2013.01)

(58) Field of Classification Search
USPC .......... 713/183, 184, 168–171, 185; 726/1–2, 726/6, 26
See application file for complete search history.

(56) References Cited

U.S. PATENT DOCUMENTS

| | | | |
|---|---|---|---|
| 2008/0216170 A1* | 9/2008 | Sanai et al. ...................... | 726/18 |
| 2010/0199095 A1* | 8/2010 | Ho ................................. | 713/171 |
| 2011/0083181 A1* | 4/2011 | Nazarov .......................... | 726/23 |
| 2012/0272288 A1* | 10/2012 | Ashbrook et al. ................ | 726/1 |
| 2012/0284783 A1* | 11/2012 | Jakobsson ......................... | 726/6 |
| 2014/0053252 A1* | 2/2014 | Kelsey ............................. | 726/6 |

* cited by examiner

*Primary Examiner* — Andrew Nalven
*Assistant Examiner* — Amir Mehrmanesh
(74) *Attorney, Agent, or Firm* — CipherLaw

(57) ABSTRACT

The systems and methods described herein can be used for enhancing the security of computer passwords by electronically receiving a password, the password comprising a plurality of components, each of the components being of a type of component, storing the received password in an electronic data store, converting the stored password to a topological representation of the password by which each of the plurality of components is represented and stored as its type of component, and storing the topological representation of the password in an electronic data store.

18 Claims, 9 Drawing Sheets

| Label | Character Set Contents | Charset Size |
|---|---|---|
| ?l | abcdefghijklmnopqrstuvwxyz | 26 |
| ?u | ABCDEFGHIJKLMNOPQRSTUVWXYZ | 26 |
| ?d | 0123456789 | 10 |
| ?s | !"#$%&'()*+,-./:;<=>?@[\]^_`{|}~ | 33 |

| Label | Character Set Contents | Charset Size |
|---|---|---|
| ?l | abcdefghijklmnopqrstuvwxyz | 26 |
| ?u | ABCDEFGHIJKLMNOPQRSTUVWXYZ | 26 |
| ?d | 0123456789 | 10 |
| ?s | !"#$%&'()*+,-./:;<=>?@[\]^_`{\|}~ | 33 |

| Length | Formula | Total Patterns |
|---|---|---|
| 8 | 4^8 | 65,536 (65.5 thousand) |
| 9 | 4^9 | 262,144 (262.1 thousand) |
| 10 | 4^10 | 1,048,576 (1.0 million) |
| 11 | 4^11 | 4,194,304 (4.2 million) |
| 12 | 4^12 | 16,777,216 (16.8 million) |
| 13 | 4^13 | 67,108,864 (67.1 million) |
| 14 | 4^14 | 268,435,456 (268.4 million) |
| 15 | 4^15 | 1,073,741,824 (1.1 billion) |
| 16 | 4^16 | 4,294,967,296 (4.3 billion) |
| 17 | 4^17 | 17,179,869,184 (17.2 billion) |
| 18 | 4^18 | 68,719,476,736 (68.7 billion) |
| 19 | 4^19 | 274,877,906,944 (274.9 billion) |
| 20 | 4^20 | 1,099,511,627,776 (1.1 trillion) |

PASSWORD TOPOLOGY MONITORING AND ENFORCEMENT

CROSS-REFERENCE TO RELATED APPLICATIONS

This application claims priority to U.S. Provisional Patent Application Ser. No. 61/859,955 filed on Jul. 30, 2013, and entitled "Password Topology Monitoring and Enforcement," the contents of which are hereby incorporated by reference herein.

REFERENCE TO GOVERNMENT FUNDING

This invention was made with government support under contract numbers DARPA-RA-11-52 and BITS-12551 awarded by DARPA. The Government has certain rights in this invention.

BACKGROUND

Current approaches to password complexity enforcement make passwords predictable, and as a consequence, can reduce security instead of improving it. These approaches do not stand up against the current topology-based password cracking techniques. Topology-based password cracking techniques are optimized to take advantage of predictable patterns in user behavior. Organizations that require complex passwords may be inadvertently making it easier for an attacker to crack a large percentage of captured password hashes because users tend to rely on easy to remember patterns that nominally meet complexity requirements, yet introduce very little entropy, making a cracking attack possible.

Many current approaches to enterprise-wide password complexity enforcement are based on enforcement of static complexity rules based in whole or part on length, use of required character sets (e.g., at least one uppercase letter, number, punctuation, etc.), basic dictionary checking (e.g., no substrings longer than N characters can be a proper noun or found in a dictionary), and historical information (e.g., new passwords must not exactly match one in the past or in the past M changes).

For example, an organization that requires passwords to be 12 characters long, contain at least one upper alpha, at least one lower alpha, numbers, and at least one special character, may find that 20% of their employees are picking passwords such as: "Summer2013!", "Spring2013!!", "Winter.2013", etc. Current behavioral-based password cracking techniques recognize these strength and complexity requirements commonly in use and exploit behavioral characteristics of users to identify weak passwords such as "F1rst.L@st" or "Foo!Bar11". In practice, this means that passwords can be subjected to a modified brute-force cracking attack based on character class password topologies such as:

ulllsulllld
ullldullls
ulllsullllsdddd
sullldddd where 'u' represents an uppercase letter, 'l' represents a lowercase letter, 'd' represents a digit, and 's' represents a special character. Techniques such as these make cracking a number of relatively long and/or complex passwords much more feasible. For example, the full key space for a 15-character password chosen from a character set containing 91 symbols is more than 5.3 billion times the size of the key space for a 15-character password, from the same character set, having a character class topology of "ulllsullllsdddd".

When combined with dictionary techniques, a password matching this topology can often be cracked easily. Thus, one of the most practical methods for cracking sets of long and/or complex passwords is to prioritize known topologies in descending order based on their relative probabilities with the goal of yielding a disproportionate number of cracked passwords relative to an unprioritized brute force approach.

BRIEF DESCRIPTION OF THE DRAWINGS

FIG. 3 illustrates example common character classes represented in a password topology.

FIGS. 8A and 8B illustrate example topology strings.

FIG. 9 illustrates different possible topologies for different lengths of plaintext.

DETAILED DESCRIPTION

Figure 1:
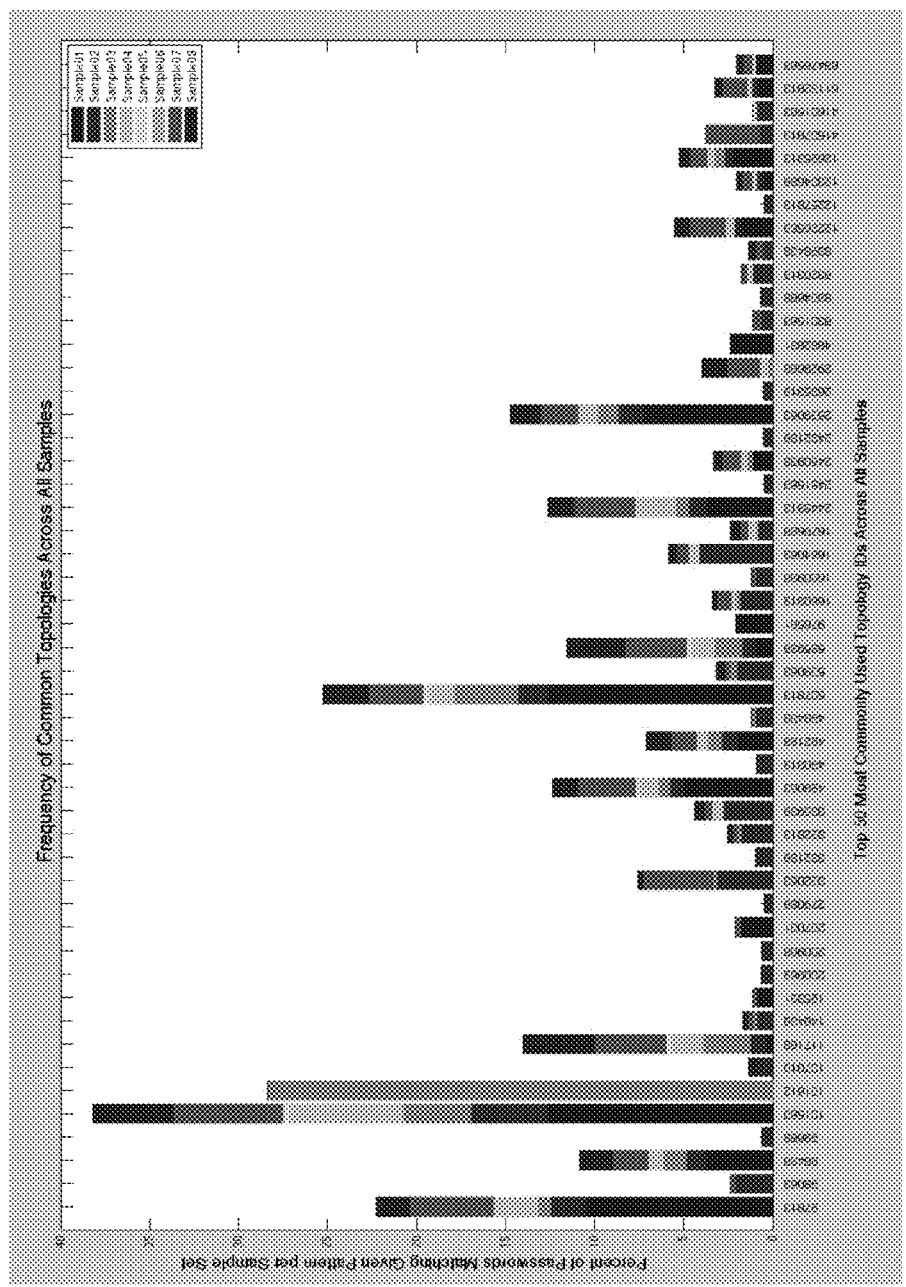
FIG. 1 illustrates an example distribution of common password topologies.

Many of the examples provided herein are made with reference to a password that is used by some device, computer, or network of computers to authenticate users. As non-limiting examples, common operating systems such as Linux, Microsoft Windows, Mac OSX, can all use password credentials to identify and authenticate users. On-line services, websites, and mobile applications also commonly use passwords for user authentication.

The password as used herein could be any means of user identification, as described in more detail below, and is not limited to an alphanumeric set of characters entered on a keyboard or touch-sensitive screen. For example, the password could also be a word spoken into a microphone, a short (e.g., 4-5 character) personal identification number (PIN), a pattern traced out on a touch-sensitive display or using a pointing device, a combination lock, or any other type of input used to confirm identity. The systems and methods described herein could be used to monitor and enforce the more uniform distribution of these other types of identity-confirming inputs.

In the case of a pattern password, a method of inputting a hand-drawn pattern password can include displaying a plurality of input keys on a touch panel. The input keys can, optionally, correspond to a unique character, numeral, or a symbol which may be displayed on or proximate to the input key. To enter a pattern password, a user can sequentially touch a sequence of some of the input keys on the touch panel to draw a user-remembered pattern password. As a result of the user drawing this pattern, a sequence of characters, numerals, and/or symbols corresponding to the input keys for drawing the pattern password are input. The graphical patterns generated by users may contain certain common elements. For example, many users may draw a perimeter box around the screen, or draw such a box with minor and predictable modifications at the beginning or end of the graphical pattern.

These patterns can be represented using a positional topology and processed using the systems and methods described herein.

As used herein, a password topology refers to an abstraction of a password or other authentication code. The abstraction can be represented using labels, as described above, or regular expressions, or any other means by which sets of inputs (the components comprising a password) can be grouped together according to common attributes.

Character sets might be chosen using other criteria, such as by groupings on a common input device. As a non-limiting example, character sets could be defined for a QWERTY keyboard based on the proximity of different keys. Topology analysis would then focus on transitions from one adjacent letter to another, or from one finger to the next to the next when a user types the password.

As used herein, a password pattern is referred to as a "topology". A topology can be defined, mapped, and stored. Password topologies are one of the factors that password crackers use to fine tune and focus on when cracking. Leveraging common topologies allows password crackers to choose the subset of possible passwords most likely to be in use by users. A topology-aware cracking approach can be used to narrow the scope of an otherwise broad brute force attempt, or can be combined with other techniques used to select common word lists ("dictionaries") and mutation rules (substituting numbers instead of letters, etc). Knowing that humans tend to follow predictable topologies reduces the work and keyspaces required to crack. Password topologies, combined with human biases and a tendency for people to pick similar topologies (e.g., "Winter2013!") are what allow modern crackers to determine 70-99% of large password sets in hours instead of months or years. Thus, while a 12 character password that requires a combination of upper/lower/numeric/special characters would appear to be sufficiently strong, exploitation of topologies substantially weakens even these apparently strong passwords.

Suppose that all possible character class topologies were enumerated, and each assigned an identifying number, such as:

ulllsulllld=1
ulllldullls=2
ulllsullllsdddd=3
ulllsullllddds=4
sullldddd=5
ulllulllsdd=6
. . .

Given a set of passwords, the number of occurrences per topology can be counted and plotted in the form of a histogram. In the example in FIG. 1, the most common topologies used across eight different sample organizations were calculated the histogram was produced. Note that this histogram shows only the top 50 most common topologies—out of over 21 million possible topologies for passwords 12 characters and shorter.

From the example above, it is clear that passwords matching topology ID 101612 (according to this particular topology→topology ID encoding scheme) is highly favored by a single organization. It is possible that this topology has an organization-centric or human-induced bias; passwords belonging to that topology would be more attractive to attackers who are attempting to optimize password-cracking efforts.

Furthermore, certain topologies for organizations having similar cultures, environments, and/or constraints (e.g., technical landscape, policies, location, language, business drivers, etc.) may yield similar biases and human nature may bend passwords along similarly weak lines given similar work environments and conditions. For instance, topologies 101563, 507813, 97813 above are favored by multiple different organizations. Any attacker who knows, discovers, or infers this relationship would be highly motivated to attempt to crack passwords for those topologies first, regardless of the organization from which password hashes were obtained.

The systems and methods described herein include password complexity monitoring and enforcement tools that can be used to reduce the effectiveness of topology-based password cracking schemes. The systems and methods described herein can be used in any or all organizations that currently use passwords for user authentication. The approaches described herein can be based on the statistics of how passwords are actually constructed to determine whether or not there are any human-induced biases that currently aid password crackers. The system can apply compensating controls to reduce or eliminate these biases.

Figure 2:
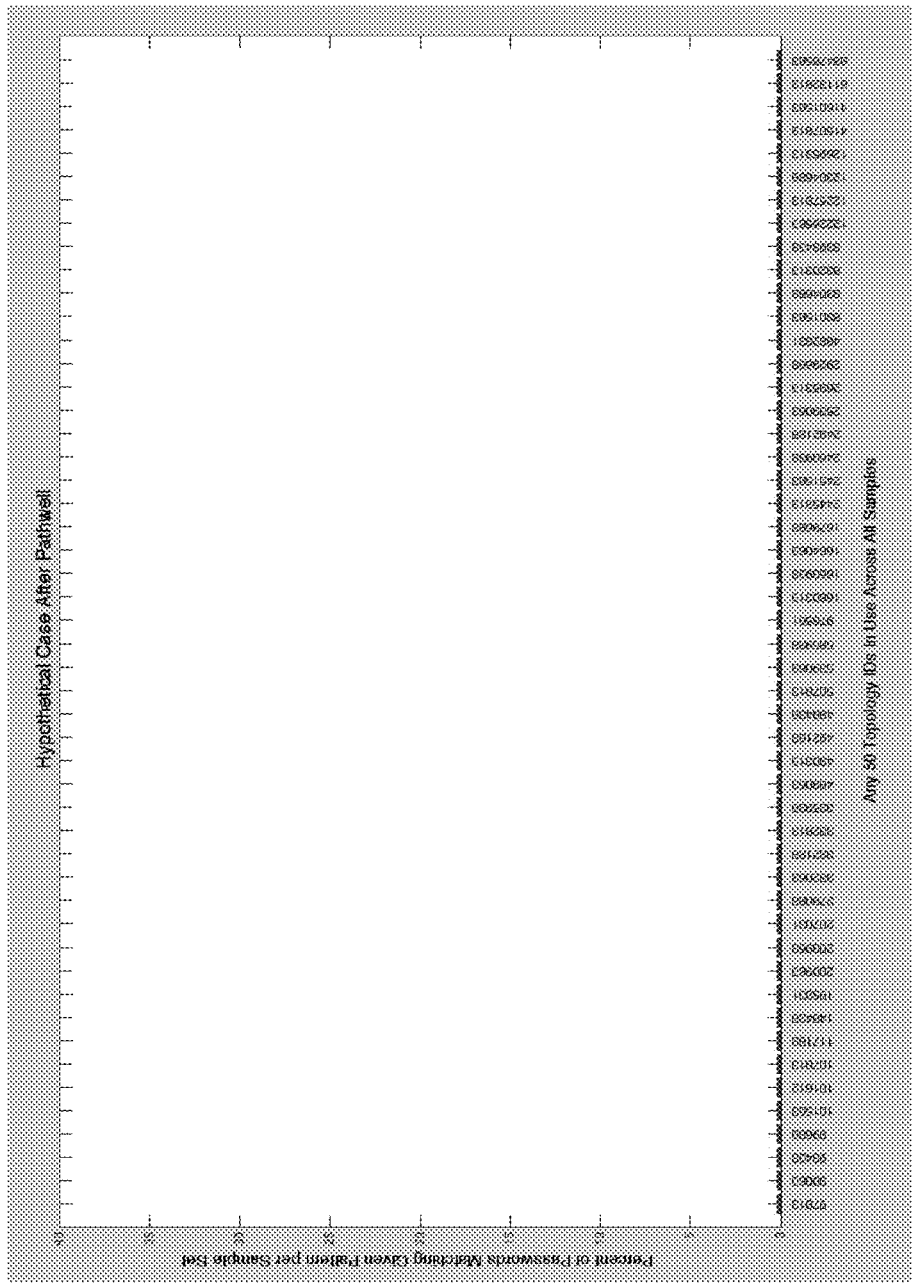
FIG. 2 illustrates an example distribution of password topologies resulting from enforcement of topological policies.

If human-induced biases in password generation could be countered by a compensating control, then the number of occurrences per topology could be made flatter, as illustrated in FIG. 2. If human-induced biases could be sufficiently reduced, then attackers could no longer prioritize their efforts based on the likelihood that certain topologies will bear more fruit than others, because multiple or all topologies will be substantially equally likely (i.e., the distribution of topologies will be substantially statistically flat). An ideal distribution could be completely flat, with no topologies used by a disproportionate number of passwords. The systems and methods described herein could be used to reduce, by varying degrees, the likelihood that certain topologies will be used more than others, and the benefits of the system can be achieved without achieving the ideal case.

The system can include a password complexity validator that actively compensates for human-induced biases. The system can also be configured to track site-specific distribution data over time. The system can actively inspect and subsequently accept or reject new passwords based on whether or not the password falls into an already or overly biased topology. In some embodiments, the system can be configured to maintain a flat, flatter, or substantially flat, password topology distribution over time.

The distribution of character class topologies can be actively tracked and shaped in an effort to eliminate human-induced biases. By removing these biases, users can be prevented from being able to follow deterministic patterns when selecting new passwords. This, in turn, may eliminate the need to store password histories in their current form.

After deploying the system in enforcement mode, the distribution will start to become flatter. To accelerate topology re-distribution, users could be forced to change their passwords while steering them away from too-common topologies. An administrator can use automated tools to monitor distribution data over time to confirm that the password topology fits a desired profile and/or remains flat or substantially flat.

As used herein, common character classes can be represented in a password topology by labeling as illustrated in the example of FIG. 3.

In some embodiments, regular expressions could also be used to represent password topologies. The ?l, ?u, ?d, and ?s labels are more compact than regular expressions, so they may be a convenient shorthand. Non-ASCII-printable characters such as foreign alphabet letters or UNICODE can also be represented in the system, as could any other input. Assuming four types of characters, in a 10 character keyspace, there are (4^10=) 1,048,576 topologies.

Modes: Monitoring

In monitoring mode (also referred to as audit mode), the system can perform tracking and/or statistical analysis. In monitoring mode, a topology group can be used to store an arbitrarily large count—to accommodate any number of users and passwords using that particular pattern. Monitoring mode can operate independently of enforcement mode (described below).

Figure 4:
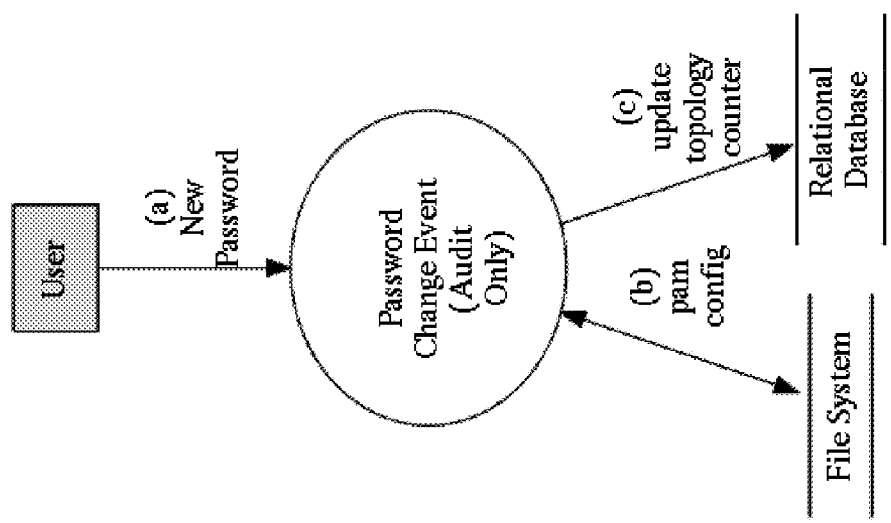
FIG. 4 illustrates an example overview of password topology monitoring.

As a non-limiting example, when a user changes a password via the passwd(1) command on a UNIX or Linux system with Pluggable Authentication Module (PAM) support, the passwd process consults the PAM configuration to determine which Pluggable Authentication Modules are enabled. The topology monitoring system can include a PAM. It can be invoked and passed the user's new password. It can then interact with its data store to record the topology chosen by the user. A flow diagram illustrating an overview of password topology monitoring is presented in FIG. 4.

Figure 5:
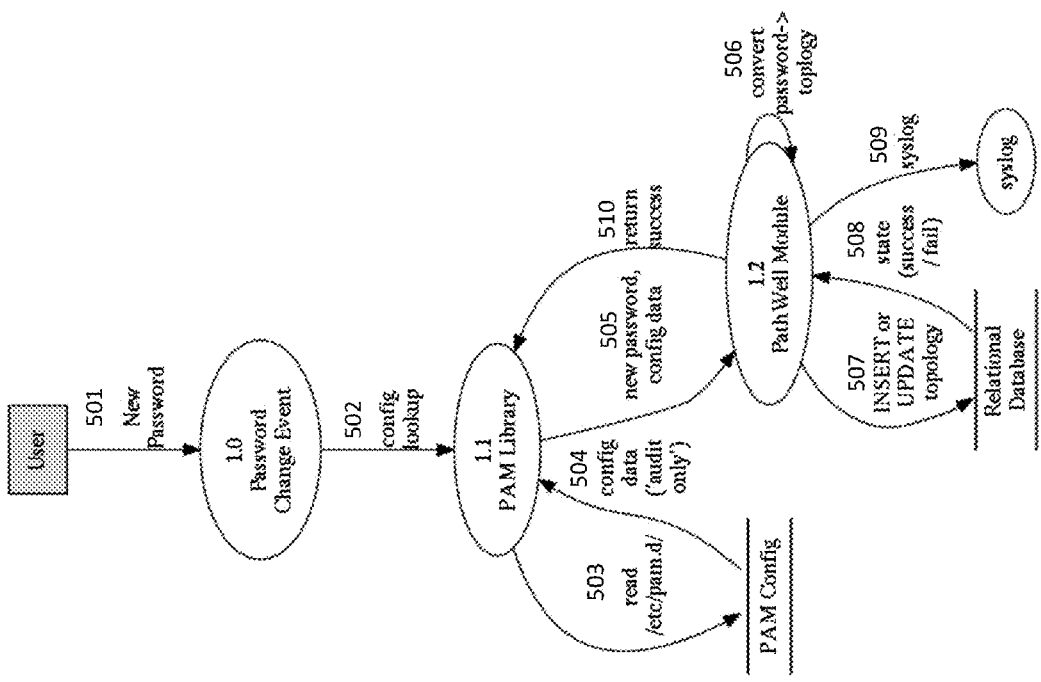
FIG. 5 illustrates example details of password topology monitoring.

With reference to FIG. 5, a more detailed explanation of the steps performed in the topology monitoring mode is illustrated:

(501) The user provides a new password (such as via the passwd command).

(502) This invokes the PAM library.

(503) The PAM library reads system configuration files, for example, stored in /etc/pam.d/{commandname} files.

(504) The configuration for the PAM module is read. Not shown are any other PAM modules which may also be invoked.

(505) The new password and configuration information (in some embodiments, including the user's old/existing password, if the user was forced to provide it to the passwd command) are passed to the module.

(506) The module converts the user-supplied password to a topology or topology ID token. For example, "abc123" would be converted to "?l?l?l?d?d?d" or to a more compact integer value suitable for storing in the data store.

(507) The module updates its data store (in this example, a relational database) to indicate that the use count for this particular topology has increased by one.

(508) The module reads the result of the database query.

(509) The module may write logs to syslog (for instance, if storing in the database failed).

(510) The module returns success or failure to the upper PAM library layers. If it is in monitoring mode, it may be configured to, in some embodiments, always return success, allowing the user's password change to continue.

Modes: Enforcement

In some embodiments, the system can be configured to evaluate and accept or reject candidate passwords. Some embodiments can include an enterprise-wide password complexity enforcement module that reduces the effectiveness of topology-based password cracking schemes. The enforcement module can include a password complexity validator that can actively compensate for human-induced biases by inspecting and subsequently accepting or rejecting each new password based on whether or not it falls into an already or overly biased topology.

Figure 6:
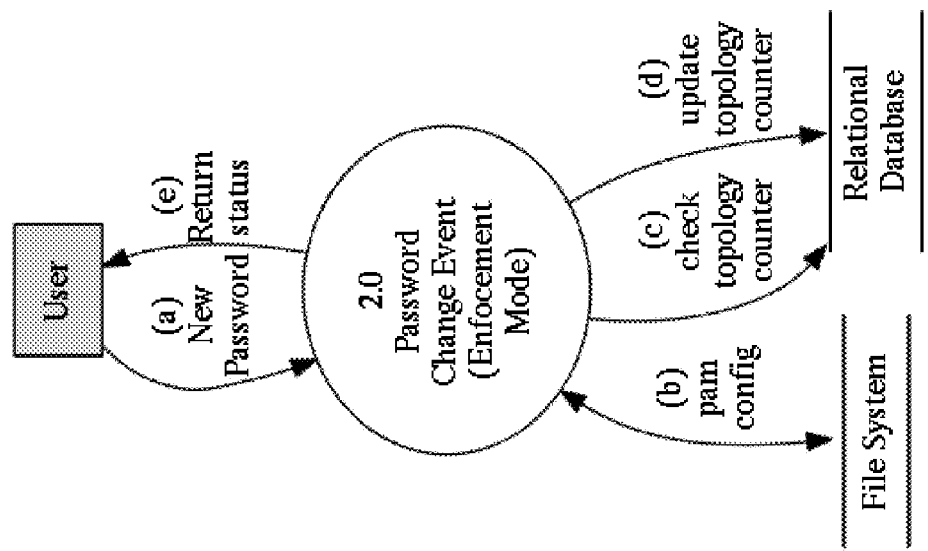
FIG. 6 illustrates an example overview of password topology monitoring in enforcement mode.

With reference to the FIG. 6, if topology monitoring is enabled in enforcement mode, processing can begin by recording the topology chosen by the user, then checking if the chosen topology is already in use (and exceeds the configured usage limit, which may be as low as 1, or may be higher). If not, then the data store is updated. If it is in use, then an error can be returned to the passwd command, and the user can be forced to try again (not shown).

The enforcement module can be configured to also enforce controls such as minimum length, no dictionary words, requiring characters from X of Y different sets, etc. These controls can be enforced as part of the password topology distribution enforcement. In some embodiments, these controls can be enforced in the system in a separate module. In some embodiments, additional, unrelated password strength enforcement may be performed.

Figure 7:
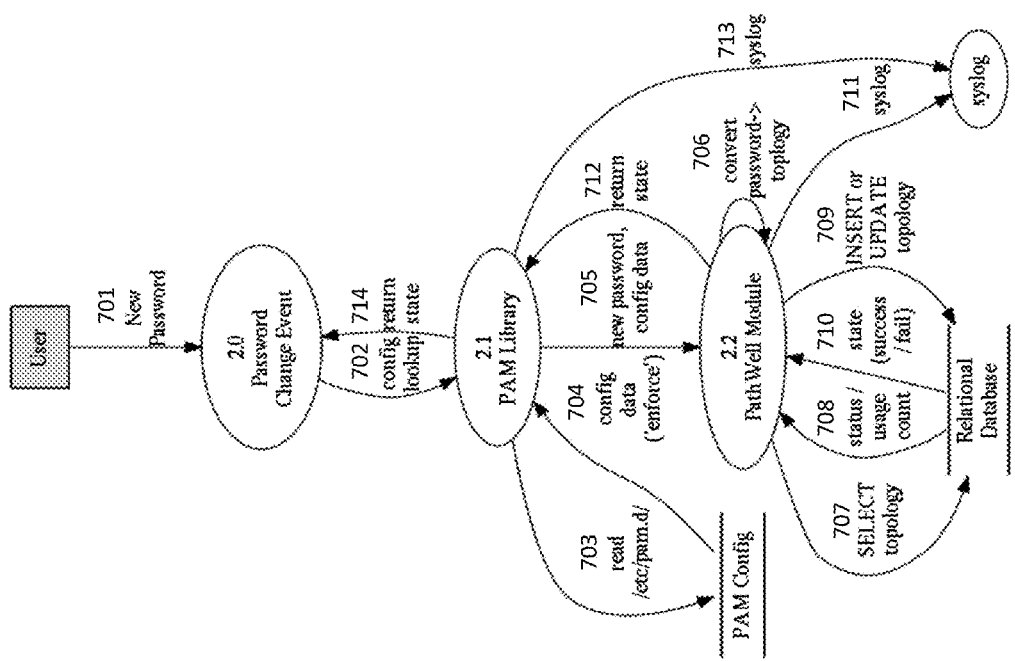
FIG. 7 illustrates example details of password topology monitoring in enforcement mode.

With reference to FIG. 7, a more detailed explanation of the steps performed in the topology enforcement mode is illustrated:

(701) The user provides a new password (for example, via the passwd command).

(702) This invokes the PAM library.

(703) The PAM library reads system configuration files, for example stored in /etc/pam.d/{commandname} files.

(704) The configuration for the PAM module is read. Not shown are any other PAM modules which may also be invoked, which may also perform their own strength or validation checks, etc.

(705) The new password and configuration information (possibly including the user's old/existing password, if the user was forced to provide it to the passwd command) are passed to the module.

(706) The module converts the user-supplied password to a topology or topology ID (identity) token. For example, "abc123" would be converted to "?l?l?l?d?d?d" or to a more compact integer value suitable for storing in the data store.

(707) The module does a lookup in its data store (in this example, a relational database) to determine if the selected topology is unavailable to the user (such as if it is already too widely used, or perhaps has been black-listed).

(708) The result of the lookup is returned to the module. If the chosen topology is not available, skip to k).

(709) The data store is updated to indicate that the chosen topology usage has incremented by one.

(710) The result of the data store update is read by the module. If the update failed, the password change may be rejected.

(711) Depending on configuration, and any errors encountered, the module may log, such as via syslog, the results of its processing.

(712) The module returns its results to the upper layer PAM libraries.

(713) The upper layer PAM libraries may log, such as via syslog, the password change transaction results.

(714) The PAM libraries can return success or failure to the passwd command, indicating either success (the new password was accepted, and changed successfully), or failure (the new password was rejected, or a failure occurred elsewhere in the PAM subsystem which caused the password change to fail).

This example as described would continue to accumulate usage counts for historical passwords even after a given user's password has changed. Some systems could retain the provenance of a given topology usage and expire the entry when it is no longer in use, so that the only the currently active set of password topologies are marked as used.

Some systems could be initialized with a set of blacklisted or pre-used topologies, including any that lack sufficient variety of character sets, or which are standard common topologies, such as anything that matches the description of one uppercase followed by several lowercase followed by several numbers, possibly followed by a special character, or other common compositions.

While some of the examples provided herein describe interfacing with a pluggable authentication module (PAM), the password topology distribution monitoring and enforcement could be implemented using a variety of other techniques. While the use of PAM may be expedient in some circumstances, the functionality described herein could be provided by configuring an application or operating system directly without the use of plugin modules. The functionality described herein can be used in connection with any system in which user authentication is performed, including as non-limiting examples, operating systems, applications, remote access tools, etc.

Levenshtein Distance

The Levenshtein (Lev) distance is the number of transformations required to transform one text string into another. Lev distances can be used as a way to compare one topology to another. A transformation is defined as switching the character class of one position of the topology string. As illustrated in FIGS. 8A and 8B, the topology strings in FIG. 8A are all a Lev distance of 1 apart, because each string can be transformed into any of the others by changing the character class of the last position. The two topology strings in FIG. 8B are Lev distance of 3 apart, because to transform one into the other, one would have to change the character class of three positions (the first three).

As a non-limiting example, some embodiments of the system can be configured to enforce a minimum Lev distance of 1 between a user's passwords, so that no two consecutive passwords can reuse the same topology.

Some embodiments can include a countermeasure to prevent a user behavior of staying close to old passwords by implementing or enforcing a Lev distance requirement. In those embodiments, when changing passwords (at least away from the initial concentrated topology), a new password's Lev distance must be greater than or equal to a system-defined constraining minimum Lev distance away from the old password.

In some embodiments, the maximum number of topologies in use at a given time cannot exceed the number of active user account passwords. That is, for a population of users, each with an active account and a current password (plus some number of system accounts) totaling N accounts, there can be at most N different patterns in use by all of those different users' current passwords at a given time.

Some embodiments can retain usage data for historical passwords as well as currently active passwords. In such an embodiment, there can be more than one topology per user marked as "used".

In other embodiments, an organization can use fewer than one topology per user so that a subset of users are using common topology patterns. In these embodiments, the number of password topologies can be less than the number of users. This can arise if the number of users exceeds the number of possible or allowed different topologies for the chosen password length.

Topology Database Storage

The system data storage can be configured based on a combination of several factors. A back-end storage strategy for the topology database can be based on:
  Space (e.g., size and compactness of individual records and fields),
  Query performance (efficient schema, well-placed indexes, etc.),
  I/O performance (writes, updates, selects, etc.),
  Scalability (to support an arbitrary number of users and a broader range of plaintext lengths and character sets),
  Complexity of software components,
  Dependencies (external or third-party software components, storage technologies, etc.),
  Maintenance (schema changes, upgrades, patches, etc.),
  Integrity (to ensure that the data are not compromised or become corrupt), and/or
  Data sensitivity (the value to a potential attacker of obtaining a copy of the topology database, and any countermeasures in place to offset that).

The data store can be used to hold distribution data for possible character class topologies for a target set of password lengths. When password topology distribution is being enforced, the topology database can be configured to store a single bit for each topology's count to indicate whether that topology is in use, or a counter (such as an integer) to indicate the use-count. In some embodiments, the presence of a record for a topology can be used as the indicator for whether that topology is in use.

Other metadata can also be recorded, such as blacklisted patterns or patterns that do not meet minimum complexity requirements. Patterns that were used by administrator override can include a special marker. In some cases, sites may deploy first in monitoring mode and then be transitioned to enforcement mode. In that case, full enforcement may start on a topology database that contains topology records with pre-incremented counters.

Encoding Options

For storage, plaintexts can be converted to patterns such as "?u?l?l?l?l?d?d?s". In the examples described herein, there are four possible tokens per character: "?d", "?l", "?u", or "?s". The number of different possible topologies for different lengths of plaintext are as illustrated in FIG. 9.

Literal Strings

Storing each topology's literal string would consume 17 bytes for an 8-character plaintext (assuming 2 bytes per token and 1 byte for a string terminator), or 33 bytes for a 16-character plaintext. By omitting the "?" component of each token, the size estimates would drop to 9 and 17 bytes, respectively. Even with that optimization, database index performance will typically degrade as the number of similar, long strings increases. For relatively short password lengths, for example of 1-12 characters, the approach outlined above would likely be adequate.

In some embodiments, topology patterns are not stored as ASCII strings. In those embodiments, each topology can be encoded into a compact integer ID. This integer could be used as a key in a database table, or it could be used as an offset into a custom data store (e.g., flat file). To help manage the complexity and transparency issues, conversion functions and/or utilities can be created and made available to administrators to translate from encoded to human-readable, and vice-versa. If using a relational database for storage, a topology's calculated integer ID could function as an index to where that pattern's record and metadata are stored in a table. In a preferred embodiments, a relational database using encoded topology integer IDs can be used.

Bitmask Encoding

An alternative approach is to encode each possible pattern as a bitmask. First, the high bit is set as a marker to ensure that no encoded value has a leading zero as that would lead to decoding ambiguities. Next, some number of bits can be used to encode the length of the pattern, and finally, each token (e.g., "?u", "?l", "?d", or "?s") can be encoded as a 2-bit value. For machine efficiency, it would be desirable to represent these values as integers that fit into a standard processor's word length (e.g., 32 or 64 bits). This has the added benefit that the integer, itself, can function as the index for either a relational database or flat-file implementation. If this approach were extended to support more character classes, such as add a class for special characters from non-English alphabets or for 8-bit non-ASCII printable characters, more bits per token could be used.

BaseN+1 Encoding

An alternative approach is to encode a pattern as a baseN+1 integer. First, the number of unique tokens can be used to determine the base, N+1, which is 5 in these examples (4 unique tokens plus 1). Next, tokens can be assigned a value from 1 to N+1 inclusively. Assigning the token values in this way ensures that no encoded value has a leading zero, which would otherwise lead to decoding ambiguities. These values can be represented as integers that fit into a standard processor's word length. A 64-bit baseN+1 representation for four character classes could hold at most 27-token password topologies. If this approach were extended to support more character classes, such as a class for special characters from non-English alphabets or for 8-bit non-ASCII printable characters, the "N" value could be increased as needed.

Data Security

The system can be configured to protect the data store and minimize its usefulness to any attackers who may be able to access and/or manipulate it. In some embodiments, the system can be configured so that password changes cannot occur if the topology database is unreachable. In some embodiments, network communications between system components can be made secure, such as by using SSL/TLS with mutual certificate authentication.

Some embodiments can include an option for randomly selecting a percentage of the pattern space and marking it as in use. In these embodiments, the attacker cannot be certain that a topology is actually used by a user password just because the topology database indicates that the topology is unavailable.

In some embodiments the topology database can also be encrypted, to prevent data-at-rest attacks.

System Architectures

The systems and methods described herein can be implemented in software, hardware, or any combination thereof. The systems and methods described herein can be implemented using one or more computing devices, which may or may not be physically or logically separate from each other. Additionally, various aspects of the methods described herein may be combined or merged into other functions.

In some embodiments, the system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, a keyboard, and an input device, such as a mouse or trackball by which the user can provide input to the computer.

A computer program can be a set of instructions that can be used, directly or indirectly, in a computer. The systems and methods described herein can be implemented using programming and/or markup languages such as Perl, Python, JAVA™, C++, C, C#, Visual Basic™, JavaScript™, PHP, Flash™, XML, HTML, etc., or a combination of programming and/or markup languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols and standards such as SOAP/HTTP, JSON, SQL, etc. may be used in implementing interfaces between programming modules. The components and functionality described herein may be implemented on any desktop or server operating system executing in a virtualized or non-virtualized environment, using any programming language suitable for software development, including, but not limited to, different versions of Microsoft™ Windows™, Apple™ Mac™, iOS™, Unix™/X-Windows™, Linux™, etc.

In some embodiments, one or more servers can function as a file server and/or can include one or more of the files used to implement methods of the invention incorporated by an application running on a user computer and/or another server. Alternatively, a file server can include some or all necessary files, allowing such an application to be invoked remotely by a user computer and/or server. The functions described with respect to various servers herein (e.g., application server, database server, web server, file server, etc.) can be performed by a single server and/or a plurality of specialized servers, depending on implementation-specific needs and parameters.

In some embodiments, the system can include one or more databases. The location of the database(s) is discretionary. As non-limiting examples, a database might reside on a storage medium local to (and/or resident in) a server (and/or a user computer). Alternatively, a database can be remote from any or all of the computing devices, so long as it can be in communication (e.g., via a network) with one or more of these. In some embodiments, a database can reside in a storage area network (SAN). The SAN can be implemented as a computerized data storage device group. Some or all of the necessary files for performing the functions attributed to the computers can be stored locally on the respective computer and/or remotely, as appropriate. In some embodiments, the database can be a relational database, such as an Oracle database, that is adapted to store, update, and retrieve data in response to SQL-formatted commands. As non-limiting examples, the database can be SQLite, MySQL or PostgreSQL. The database can be controlled and/or maintained by a database server.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, but are not limited to, a LAN, a WAN, or any of the networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations, and equivalents thereof are included within the scope of the invention.

What is claimed is:

1. A method for enhancing the security of computer passwords, the method comprising:
   electronically receiving a password, the password comprising a plurality of components, each of the components being of a type of component;
   storing the received password in an electronic data store;
   converting the stored password to a topological representation of the password by which each of the plurality of components is represented and stored as its type of component;
   storing the topological representation of the password in an electronic data store;
   querying the data store to determine a number of instances of use of the topological representation of the password;
   if the number of instances of use does not exceed a predetermined threshold, then:
   incrementing a count in a data store representing a number of uses of the topological representation of the password; and
   updating an account associated with a user with the received password.

2. The method of claim 1, further comprising:
   querying the data store to determine the number of instances of use of the topological representation of the password;
   if the number of instances of use exceeds a predetermined threshold, prompting a user to enter a second password.

3. The method of claim 1, wherein the password comprises alphanumeric characters.

4. The method of claim 3, further comprising defining a grouping of alphanumeric characters into a set based physical proximity of the characters to each other on a keyboard.

5. The method of claim 3, further comprising defining a grouping of alphanumeric characters into a set based on whether the characters are uppercase, lowercase, numeric, or special characters.

6. The method of claim 1, wherein the password is a word spoken into a microphone.

7. The method of claim 1, wherein the password is a personal identification number.

8. The method of claim 1, wherein the password is a pattern traced out on a touch-sensitive display.

9. The method of claim 1, wherein the topology is represented using labels corresponding to input types.

10. The method of claim 1, wherein the topology is represented using regular expressions to group sets of inputs together.

11. The method of claim 1, further comprising storing the topological representation of the password in a computerized data store as a compact integer value.

12. The method of claim 1, further comprising storing the topological representation of the password in a computerized data store as a topology token.

13. The method of claim 1, further comprising storing a pre-determined set of password topologies in association with a blacklist.

14. The method of claim 13, further comprising querying a data store to determine if the topological representation of the password is identified as blacklisted.

15. The method of claim 1, further comprising a password complexity monitor to compensate for human-induced biases in password topology.

16. The method of claim 1, further comprising rejecting a password of the count in a data store representing a number of uses of the topological representation of the password is greater than a predetermined value.

17. A system for enhancing the security of passwords, the system comprising:
   a computer processor configured to execute instructions for:
   electronically receiving a password, the password comprising a plurality of components, each of the components being of a type of component;
   converting the password to a topological representation of the password by which each of the plurality of components is represented and stored as its type of component; and
   an electronic data store configured for:
   storing the received password in an electronic data store;
   storing the topological representation of the password in an electronic data store;
   querying the data store to determine a number of instances of use of the topological representation of the password;

if the number of instances of use does not exceed a predetermined threshold, then:

incrementing a count in a data store representing a number of uses of the topological representation of the password; and updating an account associated with a user with the received password.

18. The system of claim 17, wherein the processor is further configured for:

querying the data store to determine the number of instances of use of the topological representation of the password;

if the number of instances of use exceeds a predetermined threshold, prompting a user to enter a second password.

* * * * *